US008428783B2

(12) United States Patent
Smith et al.

(10) Patent No.: US 8,428,783 B2
(45) Date of Patent: Apr. 23, 2013

(54) METHOD AND SYSTEM FOR DISTRIBUTED ENERGY GENERATOR MESSAGE AGGREGATION

(75) Inventors: Benjamin Smith, Petaluma, CA (US); Martin Fornage, Petaluma, CA (US)

(73) Assignee: Enphase Energy, Petaluma, CA (US)

( * ) Notice: Subject to any disclaimer, the term of this patent is extended or adjusted under 35 U.S.C. 154(b) by 0 days.

(21) Appl. No.: 13/327,276

(22) Filed: Dec. 15, 2011

(65) Prior Publication Data

US 2012/0089660 A1    Apr. 12, 2012

Related U.S. Application Data

(63) Continuation of application No. 12/583,297, filed on Aug. 18, 2009, now Pat. No. 8,099,197.

(51) Int. Cl.
| | |
|---|---|
| G05D 3/12 | (2006.01) |
| G05D 5/00 | (2006.01) |
| G05D 9/00 | (2006.01) |
| G05D 17/00 | (2006.01) |
| G01R 21/00 | (2006.01) |
| G01R 21/06 | (2006.01) |

(52) U.S. Cl.
USPC ............. 700/286; 700/295; 700/297; 702/60; 702/61; 702/62; 323/211; 323/318

(58) Field of Classification Search .................. 700/286, 700/295, 297; 702/60–62; 323/211, 318
See application file for complete search history.

(56) References Cited

U.S. PATENT DOCUMENTS

| | | | | |
|---|---|---|---|---|
| 5,848,397 | A * | 12/1998 | Marsh et al. ................ 705/14.61 |
| 5,862,186 | A * | 1/1999 | Kumar ........................... 375/324 |
| 8,065,052 | B2 * | 11/2011 | Fredriksson et al. ........... 701/36 |
| 8,099,197 | B2 * | 1/2012 | Smith et al. .................... 700/286 |
| 8,140,580 | B2 * | 3/2012 | Rehm et al. .................... 707/791 |
| 2002/0087234 | A1 * | 7/2002 | Lof et al. ........................ 700/286 |
| 2005/0034023 | A1 * | 2/2005 | Maturana et al. ................ 714/37 |
| 2006/0162772 | A1 * | 7/2006 | Presher et al. ................. 136/290 |
| 2007/0252716 | A1 * | 11/2007 | Burger ........................... 340/635 |
| 2008/0147335 | A1 | 6/2008 | Adest et al. |
| 2009/0182532 | A1 | 7/2009 | Stoeber et al. |
| 2009/0200994 | A1 * | 8/2009 | Fornage ......................... 323/207 |
| 2009/0231342 | A1 * | 9/2009 | Smith et al. .................... 345/440 |
| 2010/0091532 | A1 * | 4/2010 | Fornage ........................... 363/95 |
| 2010/0152910 | A1 * | 6/2010 | Taft ................................ 700/286 |
| 2010/0246230 | A1 * | 9/2010 | Porter et al. .................... 363/131 |
| 2010/0308662 | A1 * | 12/2010 | Schatz et al. ..................... 307/80 |
| 2011/0016147 | A1 * | 1/2011 | Fornage ......................... 707/769 |
| 2011/0019444 | A1 * | 1/2011 | Dargatz et al. ................... 363/50 |
| 2011/0101786 | A1 * | 5/2011 | Fornage et al. ................. 307/82 |
| 2011/0208366 | A1 * | 8/2011 | Taft ................................ 700/295 |

FOREIGN PATENT DOCUMENTS

WO    WO 2010/058013 A2    5/2010

OTHER PUBLICATIONS

International Search Report and Written Opinion mailed Apr. 20, 2011 for PCT Application No. PCT/US2010/045732.

* cited by examiner

*Primary Examiner* — Ramesh Patel
(74) *Attorney, Agent, or Firm* — Moser Taboada

(57) ABSTRACT

A method and system for aggregating messages. In one embodiment, the system comprises a plurality of distributed generators (DGs) and a controller, communicatively coupled to the plurality of distributed generators, for (i) receiving a plurality of messages from the plurality of DGs, (ii) correlating at least two messages in the plurality of messages based on at least one time parameter, and (iii) generating a summary message based on the at least two messages.

20 Claims, 4 Drawing Sheets

METHOD AND SYSTEM FOR DISTRIBUTED ENERGY GENERATOR MESSAGE AGGREGATION

CROSS-REFERENCE TO RELATED APPLICATIONS

This application is a continuation of co-pending U.S. patent application Ser. No. 12/583,297, filed Aug. 18, 2009. The aforementioned related patent application is herein incorporated by reference in its entirety.

BACKGROUND OF THE INVENTION

1. Field of the Invention

Embodiments of the present disclosure relate generally to a method and system for aggregating messages, and, more particularly, to a method and system for aggregating messages communicated from a distributed energy generator.

2. Description of the Related Art

Use of distributed generators (DGs) to produce energy from renewable resources is steadily gaining commercial acceptance due to the rapid depletion of existing fossil fuels and the increasing costs of current methods of generating power. One such type of distributed generator is a solar power system. Such solar power systems generally comprise large numbers of photovoltaic (PV) modules that convert solar power received into a direct current (DC). One or more inverters may be coupled to the PV modules for converting the DC current into an alternating current (AC), which may then be used to run appliances at a home or business, or may be sold to the commercial power company.

During operation of a solar power system, various messages may be generated by one or more components of the system and communicated to a central processor/controller in order to provide information for real-time monitoring of the health and status of the system. For example, inverters within the solar power system may generate alarm messages, status messages, and/or similar information messages to indicate various events and equipment states. Such messages may be communicated to the central processor/controller and displayed for real-time monitoring; additionally, such messages may be maintained in a history log, for example, within the central processor/controller, for generating history reports as well as for performing long-term analysis.

In some instances, a single event or condition may trigger a large volume of messages of the same type occurring at nearly the same time. For example, in a solar power system where each PV module is coupled to an individual inverter, a sudden change in solar irradiance across the system may trigger the same alarm message to be generated by each of the inverters and communicated to the central processor/controller. Such a large volume of messages pertaining to the same event or condition makes both history reports and long-term analysis more cumbersome, as well as reducing the efficiency of real-time monitoring.

Therefore, there is a need in the art for aggregating a plurality of messages communicated from a distributed energy generator.

SUMMARY OF THE INVENTION

Embodiments of the present invention generally relate to a method and system for aggregating messages. In one embodiment, the system comprises a plurality of distributed generators (DGs) and a controller, communicatively coupled to the plurality of distributed generators, for (i) receiving a plurality of messages from the plurality of DGs, (ii) correlating at least two messages in the plurality of messages based on at least one time parameter, and (iii) generating a summary message based on the at least two messages.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
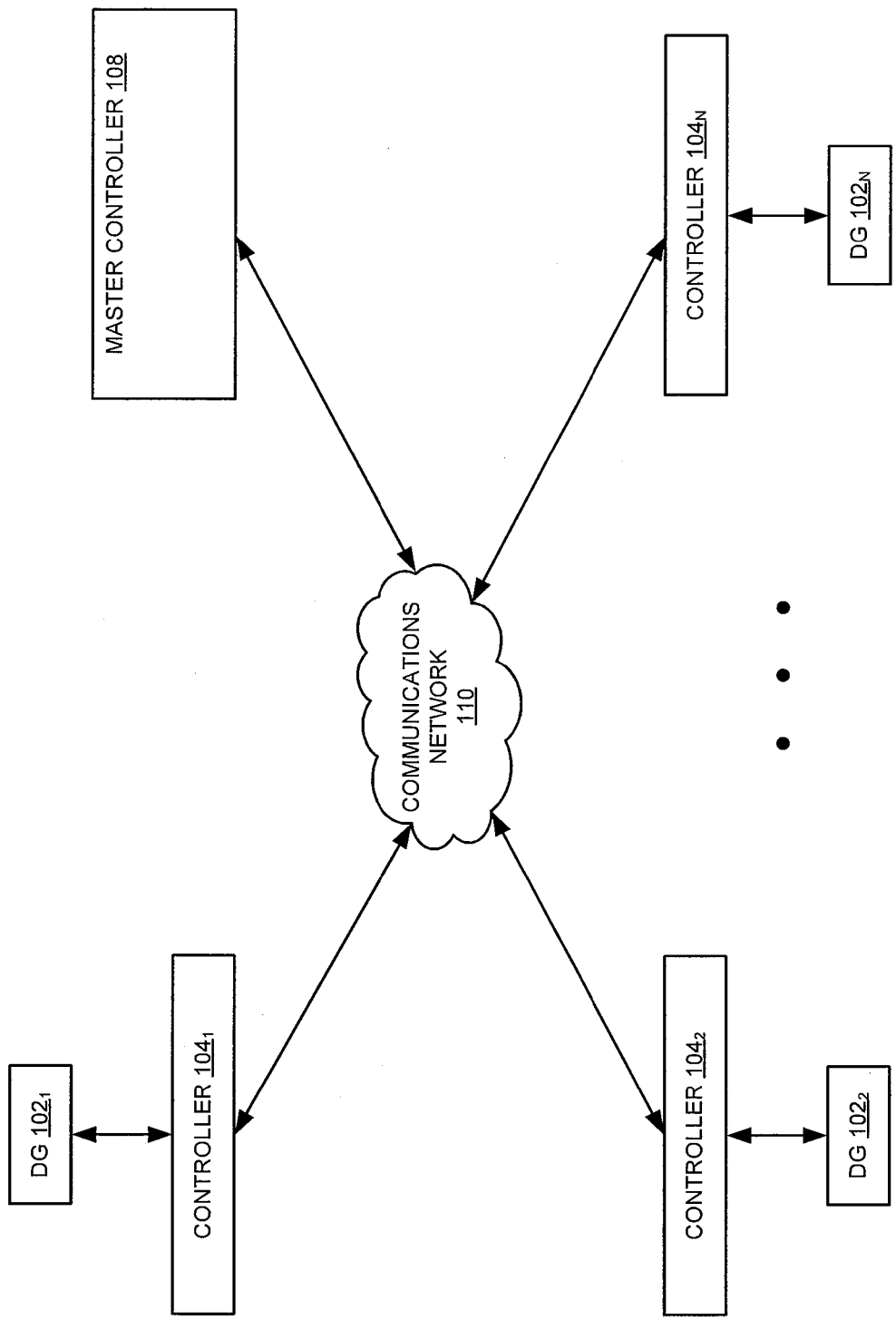
FIG. 1 is a block diagram of a distributed energy generation system in which generated messages may be aggregated in accordance with one or more embodiments of the present invention.

FIG. 1 is a block diagram of a distributed energy generation system 100 ("system 100") in which generated messages may be aggregated in accordance with one or more embodiments of the present invention. The system 100 comprises a plurality of distributed generators (DGs) $102_1$, $102_2$, ... $102_n$, (collectively referred to as DGs 102), a plurality of controllers $104_1$, $104_2$, ..., $104_n$, (collectively referred to as controllers 104), a master controller 108, and a communications network 110. The controllers 104 and the master controller 108 are communicatively coupled via the communications network 110, e.g., the Internet.

The DGs 102 (i.e., distributed energy generators) generate power from a renewable resource, such as solar energy, wind energy, hydroelectric energy, and the like. In some embodiments, a DG 102 is comprised of a plurality of PV modules coupled to one or more inverters for inverting the generated DC power to AC power; for example, each PV module may be coupled to an individual inverter in a one-to-one correspondence. Additionally, a DC/DC converter may be coupled between each PV module and each inverter (e.g., one converter per PV module). In some alternative embodiments, multiple PV modules may be coupled to a single inverter (i.e., a centralized inverter); in some such embodiments, one or more DC/DC converters may be coupled between the PV modules and the centralized inverter.

In some embodiments, the DGs 102 may comprise DC/DC converters coupled to the PV modules for generating a DC current that may be utilized directly or stored, for example, in one or more batteries. In some alternative embodiments, one or more of the DGs 102 may additionally or alternatively comprise a plurality of wind turbines, as in a "wind farm", or components for generating DC current from any other renewable energy source, as well as one or more DC/DC converters and/or one or more inverters.

Each DG $102_1$, $102_2$, ..., $102_n$ is coupled to a controller $104_1$, $104_2$, ..., $104_n$, respectively, in a one-to-one correspondence. The controllers 104 collect messages generated by components of the DG 102 that provide information on the health and state of the DG 102, such as alarm messages, status messages, and the like. Such messages may be generated at various levels of granularity; for example, for a DG 102 comprising a solar energy system, messages may be generated for one or more individual PV modules, solar panels, DC/DC converters, and/or inverters, as well as for the entire DG 102.

The collected messages are communicated from the controllers 104 to the master controller 108 and may be displayed and/or stored, e.g., within the controllers 104 and/or the master controller 108, for subsequent data analysis and/or report generation. In accordance with one or more embodiments of the present invention, the master controller 108 may correlate the collected messages from one or more DGs 102 such that a plurality of messages pertaining to a single event or state may be aggregated into a correlated group. Each message within the correlated group may be associated with an indicia of a message group, as described in detail below, such that the correlated group of messages may be identified and represented by a single message in a history report, at a user display, and the like. In some embodiments, stored messages may be retrieved to perform the aggregation; alternatively, messages may be aggregated in real-time. In some alternative embodiments, the controller 104 may perform the message aggregation for messages from the corresponding DG 102. The controller 104 may perform the message aggregation in real-time prior to storing the messages and/or transmitting the messages to the master controller 108; alternatively, the controller 104 may retrieve the messages from storage to perform the message aggregation.

In some alternative embodiments, other types of message aggregation may be performed in addition to or as an alternative to the message aggregation described below. For example, certain types of messages, such as certain types of event messages, may be hidden from view based on the nature of the message (e.g., if the message contains no actionable information for a user). Additionally or alternatively, certain types of messages, such as certain types of event messages, may only exposed to users once they have been escalated in severity, for example, by being present/open for a given period of time or when a set number of occurrences of a message type are detected within an installation.

Figure 2:
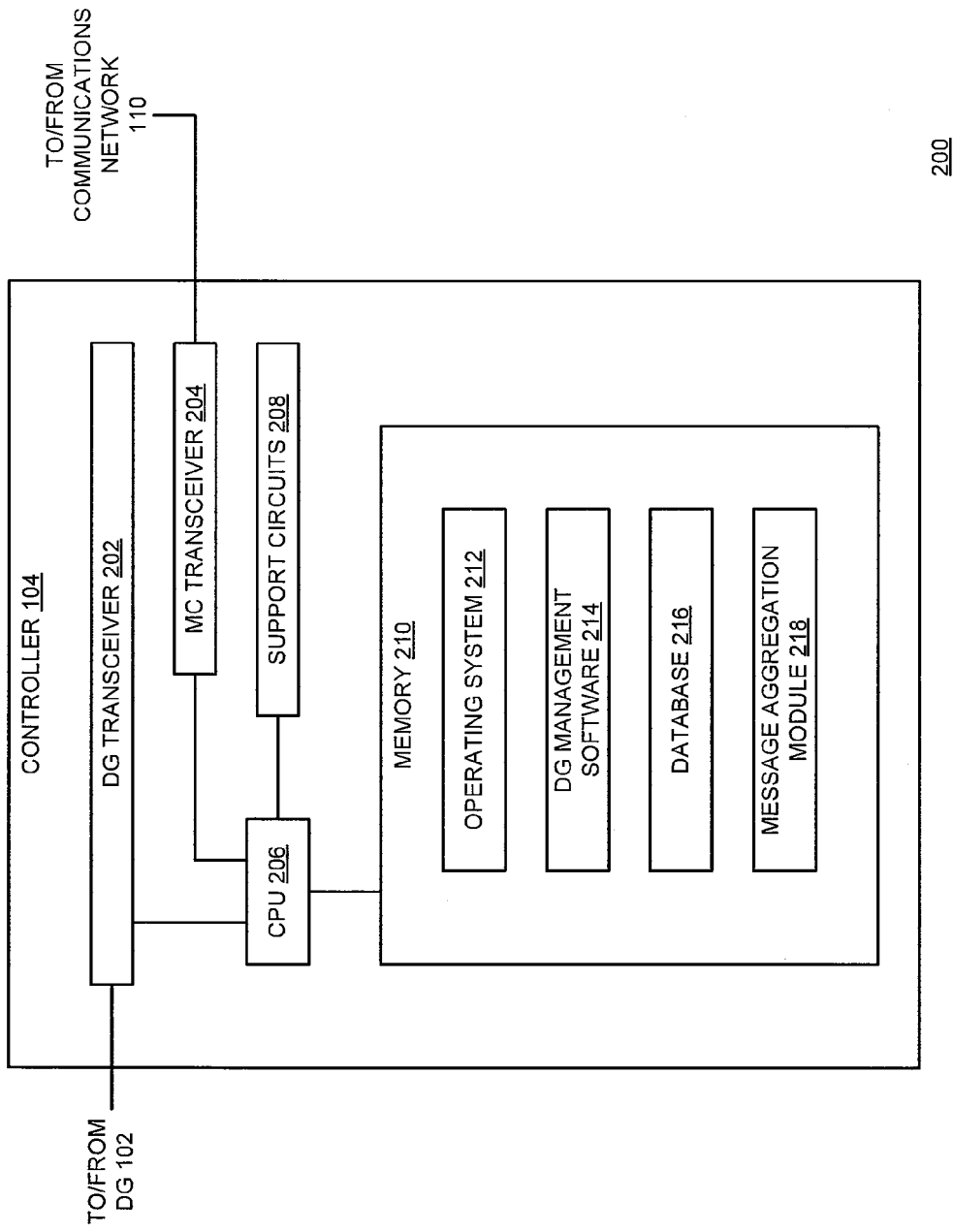
FIG. 2 is a block diagram of a controller in accordance with one or more embodiments of the present invention.

FIG. 2 is a block diagram of a controller 104 in accordance with one or more embodiments of the present invention. The controller 104 comprises a distributed generator (DG) transceiver 202, a master controller (MC) transceiver 204, at least one central processing unit (CPU) 206, support circuits 208, and a memory 210. The CPU 206 is coupled to the DG transceiver 202, the MC transceiver 204, the support circuits 208, and the memory 210, and may comprise one or more conventionally available microprocessors. Alternatively, the CPU 206 may include one or more application specific integrated circuits (ASICs). The support circuits 208 are well known circuits used to promote functionality of the CPU 206. Such circuits include, but are not limited to, a cache, power supplies, clock circuits, buses, network cards, input/output (I/O) circuits, and the like. The controller 104 may be implemented using a general purpose computer that, when executing particular software, becomes a specific purpose computer for performing various embodiments of the present invention.

The DG transceiver 202 communicates with DG 102, for example to obtain the messages generated from the DG 102. In some embodiments, the DG transceiver 202 may be coupled via power lines to one or more inverters within the DG 102, and may communicate with the inverter(s) utilizing Power Line Communications (PLC). Alternatively, the controller 104 may communicate with the inverter(s) utilizing wireless or wired communication methods, for example a WI-FI or WI-MAX modem, 3G modem, cable modem, Digital Subscriber Line (DSL), fiber optic, or similar type of technology.

The MC transceiver 204 communicatively couples the controller 104 to the master controller 108 via the communications network 110 to facilitate the management of the DG 102 (e.g., for providing the collected messages to the master controller 108). The MC transceiver 204 may utilize wireless or wired techniques, for example a WI-FI or WI-MAX modem, 3G modem, cable modem, Digital Subscriber Line (DSL), fiber optic, or similar type of technology, for coupling to the network 110 to provide such communication.

The memory 210 may comprise random access memory, read only memory, removable disk memory, flash memory, and various combinations of these types of memory. The memory 210 is sometimes referred to as main memory and may, in part, be used as cache memory or buffer memory. The memory 210 generally stores the operating system 212 of the controller 104. The operating system 212 may be one of a number of commercially available operating systems such as, but not limited to, SOLARIS from SUN Microsystems, Inc., AIX from IBM Inc., HP-UX from Hewlett Packard Corporation, LINUX from Red Hat Software, Windows 2000 from Microsoft Corporation, and the like.

The memory 210 may store various forms of application software, such as DG management software 214 for managing the DG 102 and its components, as well as a database 216 for storing data pertaining to the DG 102 (e.g., messages from the DG 102). In accordance with one or more embodiments of the present invention, the memory 210 may further store a message aggregation module 218 for aggregating the messages from the DG 102, as described in detail below with respect to FIG. 4. Such message aggregation allows a plurality of messages pertaining to the same event or state to be identified as a correlated group by an indicia of a message group, for example, by storing an association between the indicia and each message in the correlated group in the database 216. The indicia may then be utilized to identify the correlated group in order to generate a single message or notification for representing the correlated group, for example in history reports, a display at a user interface, and the like.

Figure 3:
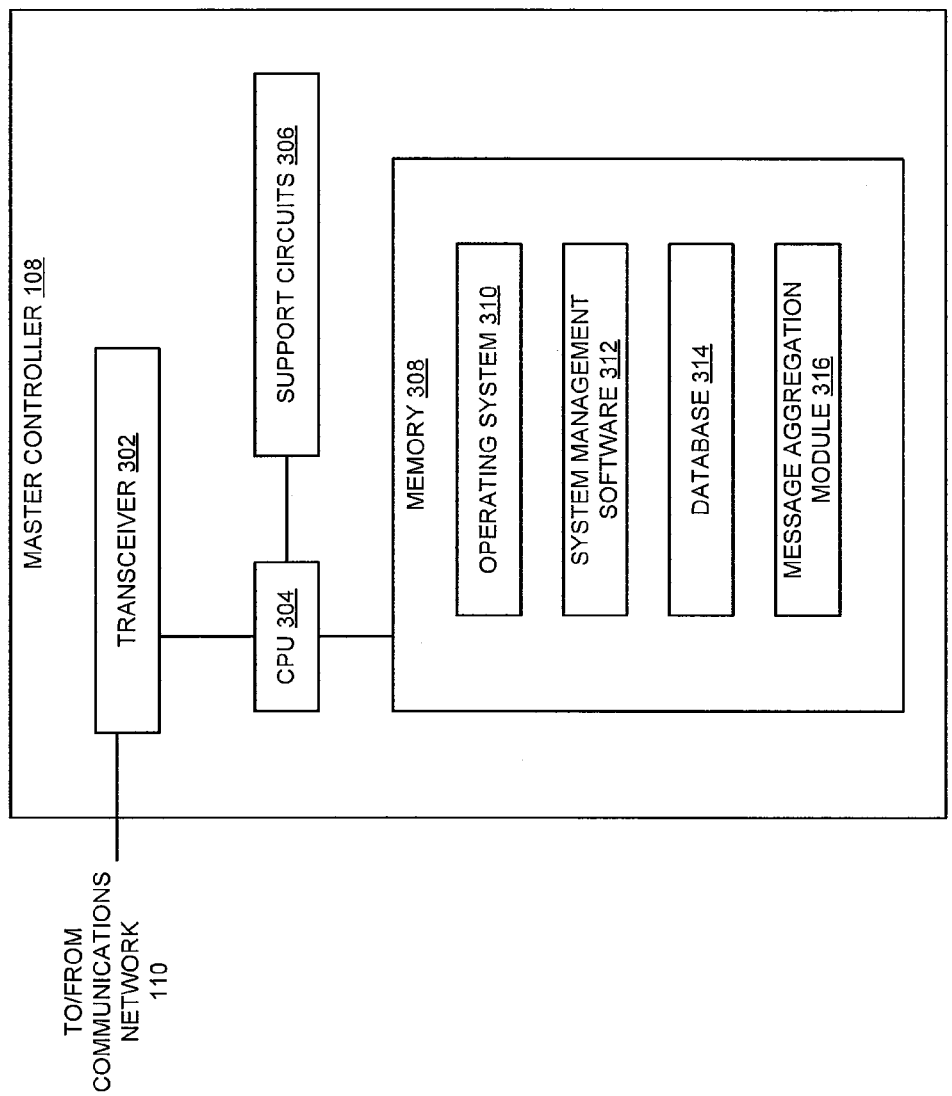
FIG. 3 is a block diagram of a master controller in accordance with one or more embodiments of the present invention.

FIG. 3 is a block diagram of a master controller 108 in accordance with one or more embodiments of the present invention. The master controller 108 comprises a transceiver 302, support circuits 306, and a memory 308 coupled to at least one central processing unit (CPU) 304. The CPU 304 may comprise one or more conventionally available microprocessors. Alternatively, the CPU 304 may include one or more application specific integrated circuits (ASICs). The support circuits 306 are well known circuits used to promote functionality of the CPU 304. Such circuits include, but are not limited to, a cache, power supplies, clock circuits, buses, network cards, input/output (I/O) circuits, and the like. The master controller 108 may be implemented using a general purpose computer that, when executing particular software, becomes a specific purpose computer for performing various embodiments of the present invention.

The transceiver 302 communicatively couples the master controller 108 to the controllers 104 via the communications network 110 to facilitate the management of the DGs 102, for example for operating the controllers 104 and/or components of the DGs 102. Additionally, the master controller 108 receives messages from the DGs 102 via the controllers 104.

The transceiver 302 may utilize wireless or wired techniques, for example a WI-FI or WI-MAX modem, 3G modem, cable modem, Digital Subscriber Line (DSL), fiber optic, or similar type of technology, for coupling to the network 110 to provide such communication.

The memory 308 may comprise random access memory, read only memory, removable disk memory, flash memory, and various combinations of these types of memory. The memory 308 is sometimes referred to as main memory and may, in part, be used as cache memory or buffer memory. The memory 308 generally stores an operating system 310 of the master controller 108. The operating system 310 may be one of a number of commercially available operating systems such as, but not limited to, SOLARIS from SUN Microsystems, Inc., AIX from IBM Inc., HP-UX from Hewlett Packard Corporation, LINUX from Red Hat Software, Windows 2000 from Microsoft Corporation, and the like.

The memory 308 may store various forms of application software, such as system management software 312, for managing DGs 102 (e.g., for collecting and storing messages from the DGs 102). The memory 308 also may store various databases, such as a database 314 for storing data related to the system 100, such as the messages from the DGs 102. In accordance with one or more embodiments of the present invention, the memory 308 may further store a message aggregation module 316 for aggregating the messages, as described in detail below with respect to FIG. 4. Such message aggregation allows a plurality of messages pertaining to the same event or condition to be identified as a correlated group by an indicia of a message group, for example, by storing an association between the indicia and each message in the correlated group in the database 314. The indicia may then be utilized to identify the correlated group in order to generate a single message or notification for representing the correlated group, for example, in history reports, a display at a user interface, and the like.

Figure 4:
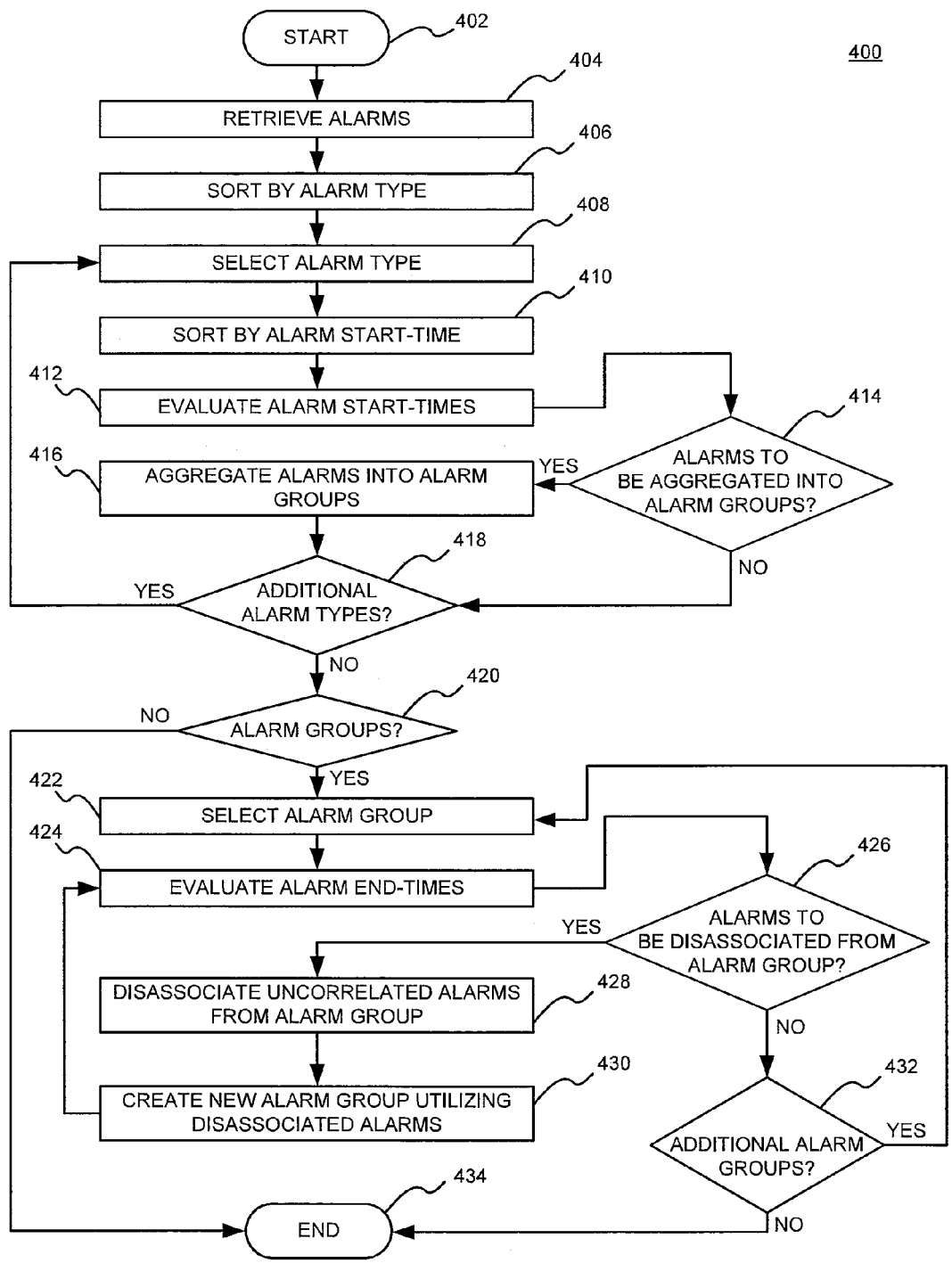
FIG. 4 is a flow diagram of a method for aggregating messages in accordance with one or more embodiments of the present invention.

FIG. 4 is a flow diagram of a method 400 for aggregating messages in accordance with one or more embodiments of the present invention. In some embodiments, such as the embodiment described below, alarm messages are aggregated such that a plurality of alarm messages pertaining to the same event may be represented by a single message or indication, for example, in a history report, at a user's display, within a database storing the alarm messages, and the like. Such alarm messages ("alarms") may be generated, for example, within a DG of the system 100 and communicated to a controller, such as a controller 104 and/or the master controller 108. In some alternative embodiments, other types of messages, such as warnings, alerts, status messages, and the like, may be aggregated. Message aggregation may be performed utilizing messages generated within one or more DGs (e.g., by inverters, DC/DC converters, and/or any other components that generate messages), or any device or system that generates any of the aforementioned messages.

In some embodiments, a computer readable medium comprises a program that, when executed by a processor, performs the method 400 for aggregating messages as described in detail below.

In some alternative embodiments, other types of message aggregation may be performed in addition to or as an alternative to the message aggregation described below. For example, certain types of messages, such as certain types of event messages, may be hidden from view based on the nature of the message (e.g., if the message contains no actionable information for a user). Additionally or alternatively, certain types of messages, such as certain types of event messages, may only exposed to users once they have been escalated in severity, for example, by being present/open for a given period of time or when a set number of occurrences of a message type are detected within an installation.

The method 400 begins at step 402 and proceeds to step 404. At step 404, alarms are retrieved from storage; alarms occurring during a pre-determined period of time may be retrieved, or, alternatively, a user may specify the time period for retrieving alarms. In some alternative embodiments, alarms may be processed utilizing the method 400 in real-time and/or prior to storing the alarms. At step 406, a message aggregation module, such as the message aggregation module 218 within the controller 104, or the message aggregation module 316 within the master controller 108, sorts the alarms by alarm type. At step 408, the message aggregation module selects a particular alarm type and, at step 410, sorts those alarms of the particular alarm type by the corresponding start-time to generate time-ordered alarms.

The method 400 proceeds to step 412, where the message aggregation module evaluates the start-times of the time-ordered alarms and, at step 414, determines whether the time-sorted alarms may be aggregated into alarm groups. Such a determination may be made, for example, based on a number of time-sorted alarms and/or the start-times of the time-sorted alarms. If the result of the determination at step 414 is no, the method 400 proceeds to step 418; if the result of the determination at step 414 is yes, the method 400 proceeds to step 416.

At step 416, the message aggregation module aggregates the time-sorted alarms into alarm groups based on the alarm start-times. In some embodiments, alarm groups may be created such that each alarm within the alarm group has a start-time occurring within a first window (e.g., a 15-minute window), for example, by utilizing a sliding window. Once alarms have been aggregated into an alarm group, an indicia of the alarm group may be associated with each alarm in the alarm group for identifying the alarm group. In some embodiments, the indicia may be associated with the corresponding alarms and stored, for example, in the database 216 and/or the database 316, along with the corresponding alarms.

The method 400 proceeds to step 418, where a determination is made whether there are additional alarm types to be processed. If the result of such determination is yes, the method 400 returns to step 408; if the result of such determination is no, the method 400 proceeds to step 420. At step 420, a determination is made whether any alarm groups have been created. If the result of such determination is no, the method 400 proceeds to step 434 where it ends; if the result of such determination is yes, the method 400 proceeds to step 422.

At step 422, the message aggregation module selects a particular alarm group. At step 424, the message aggregation module evaluates the end-times of the alarms within the selected alarm group and, at step 426, makes a determination whether alarms are to be disassociated (i.e., removed) from the alarm group. In some embodiments, alarms are to be disassociated from the alarm group if their end-times are not within a second window of others in the alarm group; for example, alarms with end-times not within 15 minutes of others in the alarm group may be disassociated from that alarm group.

If the result of the determination at step 426 is no, the method 400 proceeds to step 432; if the result of the determination at step 426 is yes, the method 400 proceeds to step 428, where the appropriate alarms are disassociated from the alarm group. In some embodiments, an alarm may be disassociated from the alarm group by removing its association to the indicia for the alarm group. Thus, after disassociating the appropriate alarms from the alarm group, the indicia maybe utilized to identify the correlated alarms remaining in the alarm group (i.e., a correlated group). Such correlated alarms may be represented by a single message or indication for alarm reporting, alarm display, and the like. In some alternative embodiments, the correlated alarms may be replaced by a single message or indication within the database 216 and/or the database 314. The method 400 proceeds to step 430, where the disassociated alarms are aggregated into a new alarm group by associating such alarms with a new indicia of the new alarm group. The method 400 returns to step 424 to determine whether any alarms should be disassociated from the new alarm group.

At step 432, a determination is made whether there are any additional alarm groups to process. If the result of such determination is yes, the method 400 returns to step 422; alternatively, if the result of such determination is no, the method 400 proceeds to step 434 and ends.

While the foregoing is directed to embodiments of the present invention, other and further embodiments of the invention may be devised without departing from the basic scope thereof, and the scope thereof is determined by the claims that follow.

The invention claimed is:

1. A system for aggregating messages, comprising:
   a plurality of distributed generators (DGs); and
   a controller, communicatively coupled to the plurality of DGs, for (i) receiving a plurality of messages from the plurality of DGs, (ii) correlating at least two messages in the plurality of messages based on at least one time parameter and a selected message type, and (iii) generating a summary message based on the at least two messages.

2. The system of claim 1, wherein the at least two messages are correlated based on start times of the at least two messages and end times of the at least two messages.

3. The system of claim 1, wherein the plurality of messages are generated by a plurality of power modules in the plurality of DGs.

4. The system of claim 3, wherein each power module in the plurality of power modules is coupled to at least one photovoltaic (PV) module.

5. The system of claim 4, wherein each power module in the plurality of power modules is a DC/DC converter.

6. The system of claim 4, wherein each power module in the plurality of power modules is a DC/AC inverter.

7. The system of claim 1, wherein correlating the at least two messages comprises (a) sorting the plurality of messages by message type to generate sorted messages; (b) selecting, from the sorted messages, messages having a particular message type to generate selected messages; (c) ordering the selected messages by start times to generate time-ordered messages; and (d) forming, based on the start times of the time-ordered messages, at least one alarm group.

8. The system of claim 7, wherein correlating the at least two messages further comprises (e) disassociating, from an alarm group of the at least one alarm group, all messages having end times that fail to meet a time-window criteria.

9. A method for aggregating messages, comprising:
   receiving, at a controller, a plurality of messages from a plurality of distributed generators (DGs);
   correlating, by the controller, at least two messages in the plurality of messages based on at least one time parameter and a selected message type; and
   generating, by the controller, a summary message based on the at least two messages.

10. The method of claim 9, wherein the at least two messages are correlated based on start times of the at least two messages and end times of the at least two messages.

11. The method of claim 9, further comprising generating, by a plurality of power modules in the plurality of DGs, the plurality of messages.

12. The method of claim 11, wherein each power module in the plurality of power modules is coupled to at least one photovoltaic (PV) module.

13. The method of claim 12, wherein each power module in the plurality of power modules is a DC/DC converter.

14. The method of claim 12, wherein each power module in the plurality of power modules is a DC/AC inverter.

15. The method of claim 9, wherein correlating the at least two messages comprises (a) sorting the plurality of messages by message type to generate sorted messages; (b) selecting, from the sorted messages, messages having a particular message type to generate selected messages; (c) ordering the selected messages by start times to generate time-ordered messages; and (d) forming, based on the start times of the time-ordered messages, at least one alarm group.

16. The method of claim 15, wherein correlating the at least two messages further comprises (e) disassociating, from an alarm group of the at least one alarm group, all messages having end times that fail to meet a time-window criteria.

17. A non-transitory computer readable medium comprising a program that, when executed by a processor, performs a method of aggregating messages, the method comprising:
   receiving a plurality of messages from a plurality of distributed generators (DGs);
   correlating at least two messages in the plurality of messages based on at least one time parameter and a selected message type; and
   generating a summary message based on the at least two messages.

18. The non-transitory computer readable medium of claim 17, wherein the plurality of messages are generated by a plurality of power modules in the plurality of DGs, and wherein the plurality of messages pertain to operation of the power modules.

19. The non-transitory computer readable medium of claim 18, wherein each power module in the plurality of power modules is a DC/AC inverter and is coupled to at least one photovoltaic (PV) module.

20. The non-transitory computer readable medium of claim 17, wherein correlating the at least two messages comprises (a) sorting the plurality of messages by message type to generate sorted messages; (b) selecting, from the sorted messages, messages having a particular message type to generate selected messages; (c) ordering the selected messages by start times to generate time-ordered messages; (d) forming, based on the start times of the time-ordered messages, at least one alarm group; and (e) disassociating, from an alarm group of the at least one alarm group, all messages having end times that fail to meet a time-window criteria.

* * * * *